United States Patent

Fujimoto et al.

(10) Patent No.: US 9,802,310 B2
(45) Date of Patent: Oct. 31, 2017

(54) MOBILE ROBOT ESTIMATING OWN POSITION USING A CLASS-BASED OWN-POSITION ESTIMATION UNIT

(71) Applicant: Hitachi, Ltd., Chiyoda-ku, Tokyo (JP)

(72) Inventors: Keisuke Fujimoto, Tokyo (JP); Nobutaka Kimura, Tokyo (JP); Toshio Moriya, Tokyo (JP); Taiki Fuji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/693,282

(22) Filed: Apr. 22, 2015

(65) Prior Publication Data

US 2015/0321346 A1 Nov. 12, 2015

(30) Foreign Application Priority Data

May 8, 2014 (JP) .................................. 2014-096462

(51) Int. Cl.
G06F 19/00 (2011.01)
B25J 9/10 (2006.01)
G05D 1/02 (2006.01)

(52) U.S. Cl.
CPC ................ B25J 9/10 (2013.01); G05D 1/024 (2013.01); G05D 1/0274 (2013.01);
(Continued)

(58) Field of Classification Search
CPC .......... B25J 9/10; B25J 9/1676; B25J 9/1664; G05D 1/0274; G05D 1/0214;
(Continued)

(56) References Cited

U.S. PATENT DOCUMENTS 7,689,321 B2 * 3/2010 Karlsson .............. G05D 1/0246
318/103
8,798,840 B2 * 8/2014 Fong .................... G05D 1/0274
700/258
(Continued)

FOREIGN PATENT DOCUMENTS

CN 101000507 A 7/2007
CN 101509781 A 8/2009
(Continued)

OTHER PUBLICATIONS

Chinese Office Action issued in counterpart Chinese Application No. 201510212751.4 dated Jun. 29, 2017 with partial English translation (16 pages).
(Continued)

Primary Examiner — Rachid Bendidi
(74) Attorney, Agent, or Firm — Crowell & Moring LLP

(57) ABSTRACT

A robot is provided. A measurement unit measures an object in a space. An own-position estimation unit calculates an own position of a mobile unit moving through the space by matching measurement data acquired by the measurement unit with map data representing information about the object in the space. A classification unit acquires class-based measurement data obtained by classifying the measurement data into at least two predetermined classes. A class-based own-position estimation unit estimates an own position of the mobile unit for each of the at least two predetermined classes by matching a class-based map having a position of the objects recorded therein for each class with the class-based measurement data. An integration unit configured to integrate the own positions estimated for the respective at least two predetermined classes. A control unit controls the mobile unit based on information from the integration unit.

15 Claims, 20 Drawing Sheets

(52) U.S. Cl.
CPC ..... *G05D 2201/0216* (2013.01); *Y10S 901/01* (2013.01); *Y10S 901/47* (2013.01)

(58) Field of Classification Search
CPC ...... G05D 1/0238; G05D 1/024; G05D 1/027; G05D 1/0278; G05D 1/0044; G05D 1/0088; G05D 1/0231; G05D 1/0242; G05D 1/0251; G05D 1/0255; Y10S 901/01; Y10S 901/47
See application file for complete search history.

(56) References Cited

U.S. PATENT DOCUMENTS

| | | | |
|---|---|---|---|
| 2004/0167669 A1* | 8/2004 | Karlsson | G01C 21/12 700/259 |
| 2004/0230340 A1* | 11/2004 | Fukuchi | G05D 1/0088 700/245 |
| 2005/0187678 A1* | 8/2005 | Myeong | G05D 1/0255 701/27 |
| 2007/0100498 A1* | 5/2007 | Matsumoto | G05D 1/024 700/245 |
| 2007/0156286 A1* | 7/2007 | Yamauchi | G05D 1/0038 700/245 |
| 2009/0326713 A1* | 12/2009 | Moriya | A63H 17/00 700/255 |
| 2010/0094460 A1 | 4/2010 | Choi et al. | |
| 2011/0010033 A1* | 1/2011 | Asahara | G05D 1/024 701/26 |

FOREIGN PATENT DOCUMENTS

| | | |
|---|---|---|
| CN | 102538779 A | 7/2012 |
| JP | 5452442 B2 | 3/2014 |

OTHER PUBLICATIONS

Wei, "Design and implementation of panoramic vision system for RoboCup medium-sized robots", Chinese Doctoral Dissertations & Master's Theses Full-text Database (Master) Information Science and Technology, the 3rd phase, 2006, pp. 33-47 with English translation (30 pages).

* cited by examiner

MOBILE ROBOT ESTIMATING OWN POSITION USING A CLASS-BASED OWN-POSITION ESTIMATION UNIT

CLAIM OF PRIORITY

The present application claims priority from Japanese patent application JP2014-96462 filed on May 8, 2014, the content of which is hereby incorporated by reference into this application.

BACKGROUND

In order for a robot to autonomously move through a space and perform a certain specific task, the robot needs to estimate its own position with respect to the surrounding environment. One known estimation method is to match a shape of the surrounding environment measured using a distance sensor mounted on the robot with an environment map prepared in advance.

Further, in Japanese Patent No. 5452442, there is disclosed a method in which, in order to continue an operation of the robot even when there is a region in which an arrangement or a shape of the objects in the space changes over time, the robot automatically updates an environment map based on a set region to be updated.

SUMMARY

The map updating method described in Japanese Patent No. 5452442 is based on the assumption that the robot is capable of frequently measuring a completely still object in a region that is not to be updated. When the region to be updated is extensive and the measurement range of the distance sensor for that region is narrow, the updating of the map is carried out without measuring a completely still object for long periods, which can lead to a distorted map being produced for that region. Consequently, there has been a problem in that when the robot moves from a region in which movable objects are dominant into a region in which completely still objects are dominant, a phenomenon occurs in which an own-position estimation result momentarily changes dramatically, which can prevent the robot from operating normally.

Therefore, there is a need for a robot capable of obtaining a seamless own-position estimation result even when a robot moves back and forth between a region in which movable objects are dominant and a region in which completely still objects are dominant.

A representative example of this invention is a robot, including: a measurement unit configured to measure an object in a space; a storage unit configured to store map data representing information about the object in the space determined in advance; an own-position estimation unit configured to calculate an own position of a mobile unit moving through the space by matching measurement data acquired by the measurement unit with the map data; a classification unit configured to acquire class-based measurement data obtained by classifying the measurement data into at least two predetermined classes; a class-based own-position estimation unit configured to estimate an own position of the mobile unit for each of the at least two predetermined classes by matching a class-based map having a position of the objects recorded therein for each class with the class-based measurement data; an integration unit configured to integrate the own positions estimated for the respective at least two predetermined classes; and a control unit configured to control the mobile unit based on information from the integration unit.

According to one embodiment of this invention, a seamless own-position estimation result can be obtained.

DETAILED DESCRIPTION OF THE EMBODIMENTS

First Embodiment

Embodiments of this invention are described below with reference to the drawings. In the following embodiments, a procedure operated by a mobile robot equipped with a manipulator is described.

Figure 1:
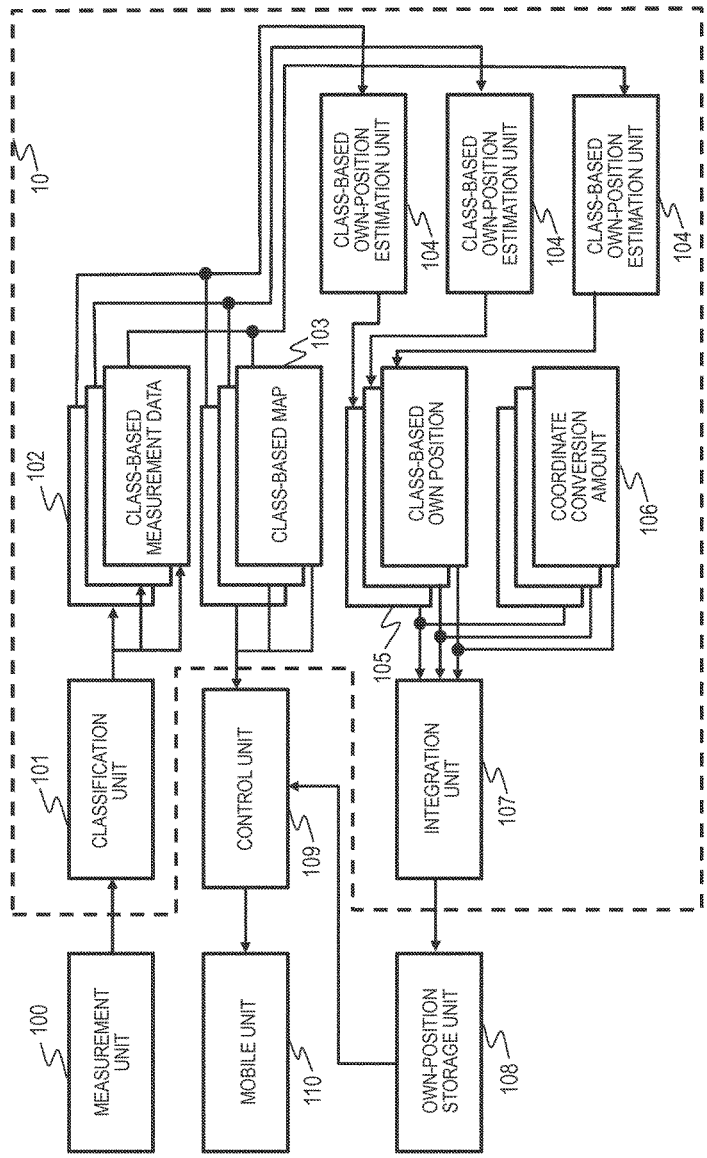
FIG. 1 is a conceptual diagram illustrating a robot according.

FIG. 1 is a conceptual diagram illustrating a robot according to this embodiment. The robot according to this invention includes a measurement unit 100 configured to measure surrounding objects and an own-position estimation unit 10 configured to estimate an own position of the robot. The measurement data measured by the measurement unit 100 is classified by a classification unit 101 into two or more classes defined in advance, to thereby produce class-based measurement data 102.

Further, the robot includes class-based own-position estimation units 104, each of which is configured to estimate an own position by preparing in advance for each class a class-based map 103 representing position information about objects, and geometrically matching the class-based measurement data 102 with the map 103 corresponding to that class.

In addition, the robot includes an integration unit 107 configured to determine an own position of the robot by converting each estimated class-based own position 105 into a predetermined common coordinate system by adding a coordinate conversion amount 106 obtained from a comparative positional relationship among each of the maps, and integrating each of the class-based own positions.

The own position obtained by the integration unit 107 is stored in an own-position storage unit 108. A control unit 109 autonomously moves the robot by reading the positions of surrounding objects from a class-based map storage unit, and controlling a mobile unit 110 so that the robot does not collide with the objects in the space. For example, the position of mobile unit 110 corresponds to own position of the robot.

Figure 2:
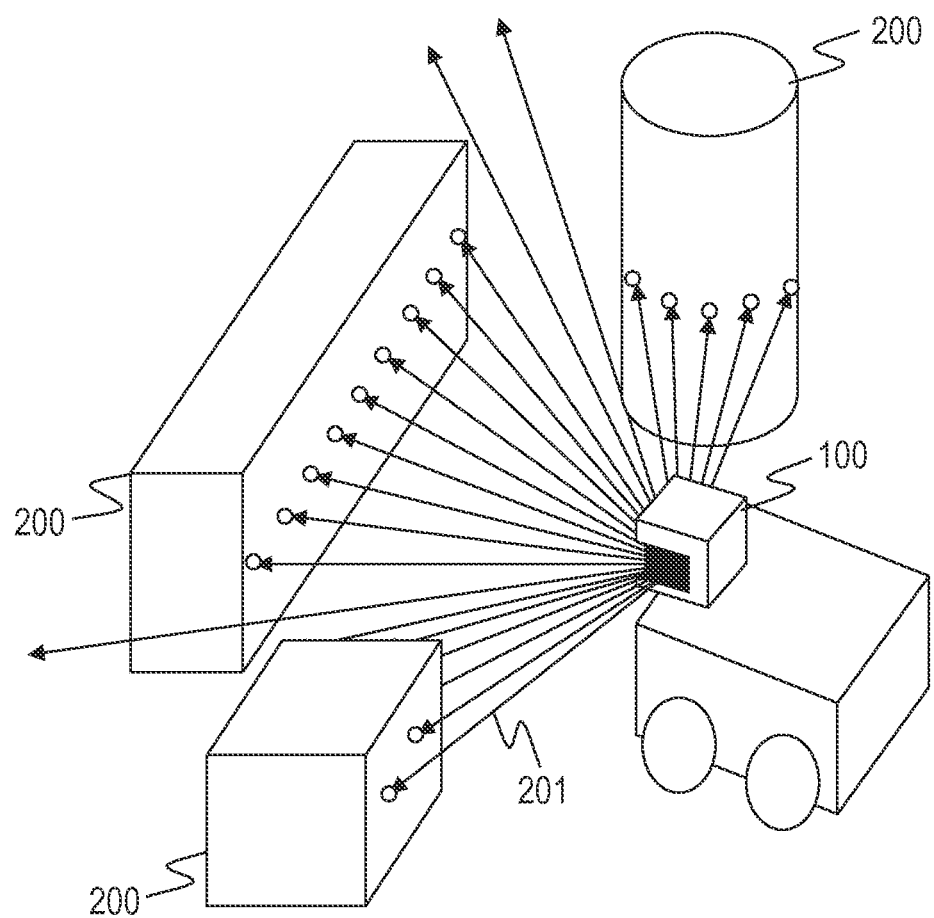
FIG. 2 is a conceptual diagram illustrating a case of measuring the distances to surrounding objects.

The measurement unit 100 is capable of measuring a predetermined attribute of the objects in the space. FIG. 2 is a conceptual diagram illustrating a case of measuring the distances to surrounding objects 200. Here, for the sake of explanation, a case is described in which a distance sensor using laser 201 is employed as the measurement apparatus of the measurement unit 100. The measurement unit 100 radiates the output laser 201 onto the surrounding objects 200, receives the reflected light from the objects 200, and measures the distances to the objects 200 based on the time taken from the radiation to the reception. Performing this operation in all surrounding directions enables the shapes of the surrounding objects to be measured. Further, the reflection intensity of a target object can be obtained by measuring the intensity of the laser light returning from the target object.

It should be noted that the measurement apparatus of the measurement unit 100 is not limited to a distance sensor employing laser, a camera or sonar may also be used, as long as the measurement apparatus measures the surrounding objects. When a camera is used, the shapes of the objects or a comparative orientation of the measurement unit 100 with respect to the objects can be measured based on marker recognition, image feature extraction, and the like. Further, the measurement unit may include two or more sensors.

Figure 3:
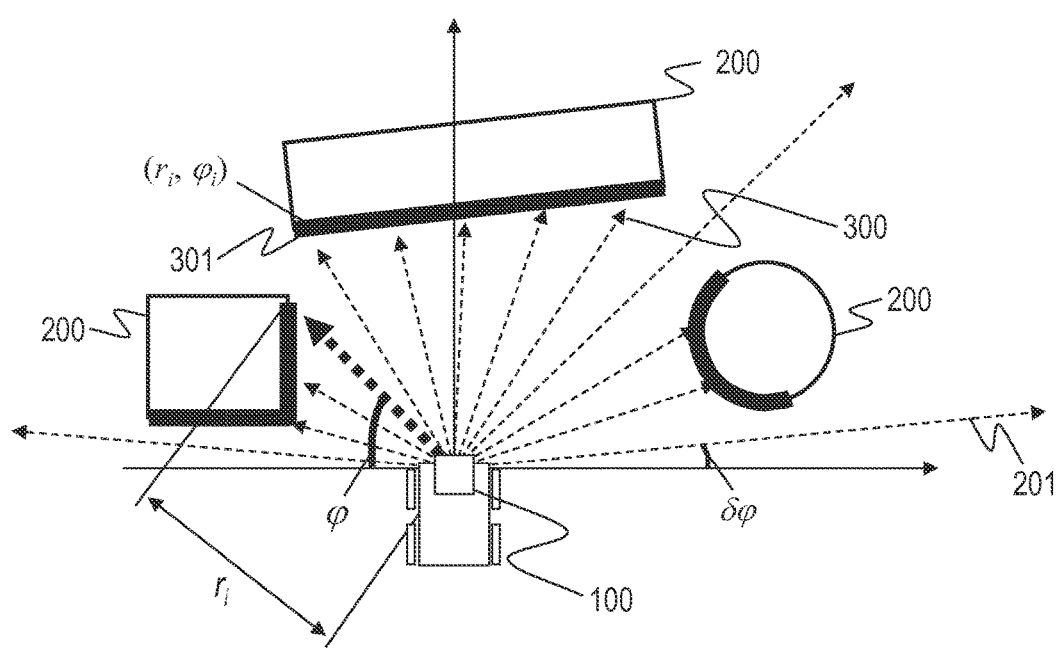
FIG. 3 illustrates an example in which the shapes of the surrounding objects are measured by the measurement unit.

FIG. 3 illustrates an example in which the shapes of the surrounding objects are measured by the measurement unit 100. In this embodiment, the measurement unit 100 receives reflected laser light that has hit objects located in various directions, and measures the distances to the objects based on a time difference from the radiation to the reception.

The measurement unit 100 simultaneously measures n pieces of data while changing the measurement direction $\phi$ by a predetermined angular resolution $\delta\phi$ each time. The measurement direction of an i-th piece of measurement data is represented as $\phi_i$, and the measured distance is represented as $r_i$. The combination $(r_i,\phi_i)$ of distance and direction at this stage is the position of the object to be measured represented in a polar coordinate system with the measurement unit 100 at the center.

It should be noted that the measurement data indicated by the dotted arrows represent the tracks of the laser 201 during measurement, and the end points of the arrows are measurement point positions 300. The thin solid lines represent the objects 200 in a space. The dotted arrows hitting these objects are data that has been successfully measured. The laser beams that do not hit a thin solid line indicate that no measurements could be made. The thick solid lines 301 represent the ultimately measured shapes 301. The conversion from the position $(r_i,\phi_i)$ represented in a polar coordinate system into an orthogonal coordinate system $(s_{xi},s_{yi})$ with the measurement unit 100 at the origin is carried out based on Expression 1.

$$s_{xi} = r_i \cos \phi_i$$

$$s_{yi} = r_i \sin \phi_i \quad \text{Expression 1}$$

$$i \in \{1 \ldots n\}$$

Figure 4:
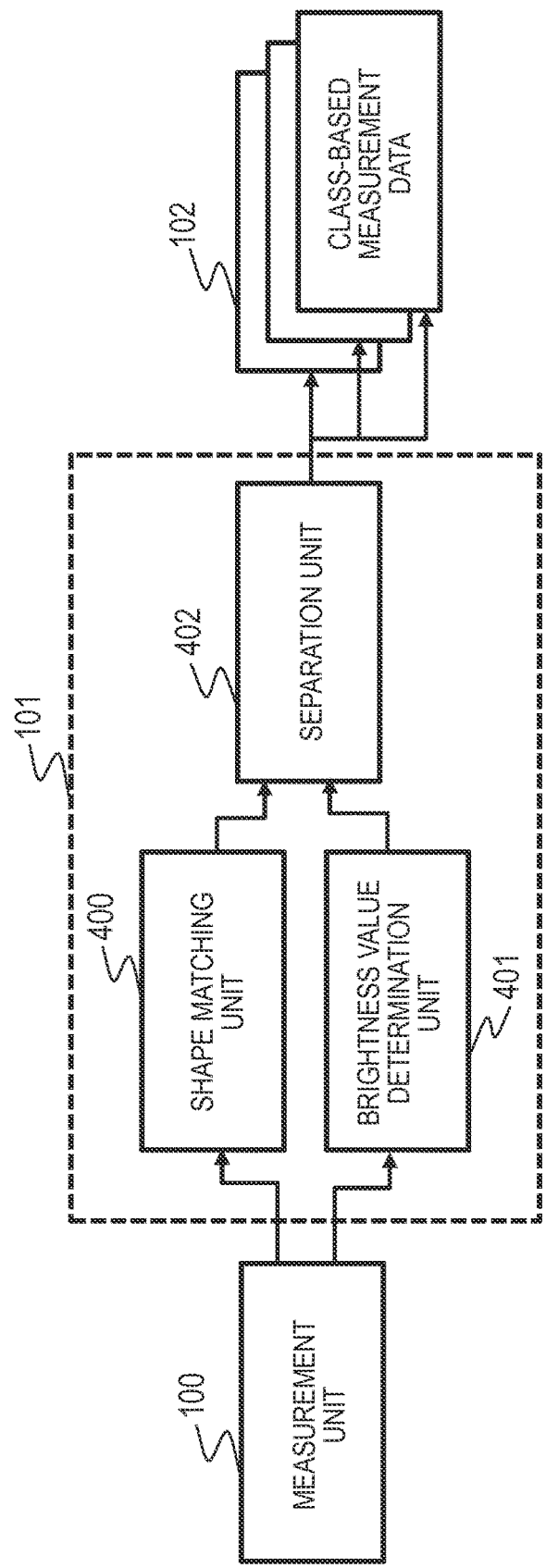
FIG. 4 illustrates a processing example by the classification unit.

The classification unit 101 divides the objects into classes based on an attribute of the objects measured by the measurement unit 100. FIG. 4 illustrates a processing example by the classification unit 101. The classification unit 101 includes a shape matching unit 400, a brightness value determination unit 401, and a separation unit 402 configured to separate the measurement data using the results from the shape matching unit 400 and the brightness value determination unit 401. The shape matching unit 400 is configured to search the objects measured by the measurement unit 100 for objects matching a predetermined shape.

In the case of searching for a linear shape, when a straight line is fitted to the shapes of the objects obtained by measuring, and a region on the straight line is present in a fixed amount or more, this region is output as a straight line. Further, when there are no other shapes surrounding the measured point, a small column, such as a shelf leg, is obtained by extracting that region.

Further, using the reflection intensity of the measurement target object obtained by the measurement unit 100, the classification unit 101 classifies the measurement data with the brightness value determination unit 401 based on whether or not the reflection intensity value is equal to or more than a threshold. The classification unit 101 outputs the classification results obtained by these processes with the separation unit 402 as the class-based measurement data 102 that are different to each other. It should be noted that the classification unit 101 may be configured so as to include only any one of the shape matching unit 400 and the brightness value determination unit 401.

Figure 5:
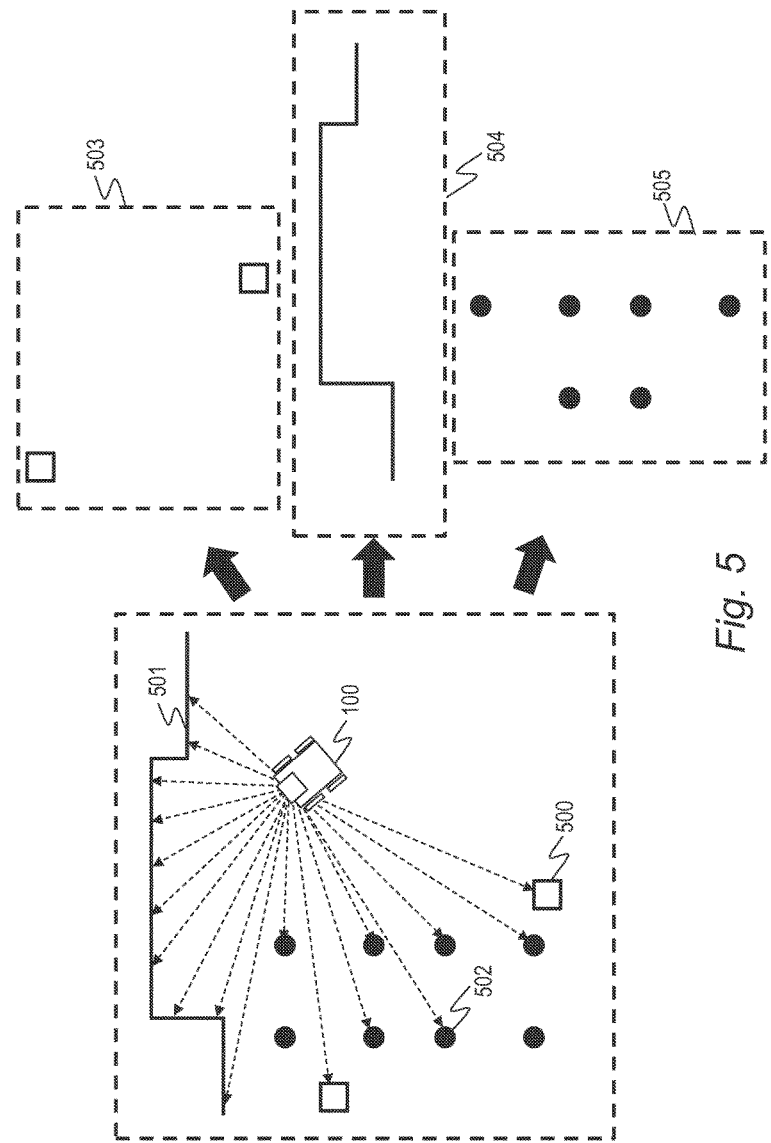
FIG. 5 illustrates an example of the results classified by the classification unit.

FIG. 5 illustrates an example of the results classified by the classification unit 101. For example, the environment may include a pole 500 having a high reflection intensity, a wall 501, and a thin column 502. The classification unit 101 measures these objects with the measurement unit 100, and classifies the measured objects as the above-mentioned pole 500, a linear shape 501, and a column 502. As described above, first, the classification unit 101 separates the pole by extracting only the measurement result exhibiting a high reflection intensity from the measurement data, and sets the separated data as pole-related class-based measurement data 503. Next, the classification unit 101 searches through the remaining measurement data for a linear component, extracts the obtained linear component as a wall by separating the linear component from the remaining measurement data, and sets this data as wall-related class-based measurement data 504. Lastly, the classification unit 101 extracts the thin column by searching around the measurement point for other objects that do not have a shape, and sets this data as column-related class-based measurement data 505.

Figure 6:
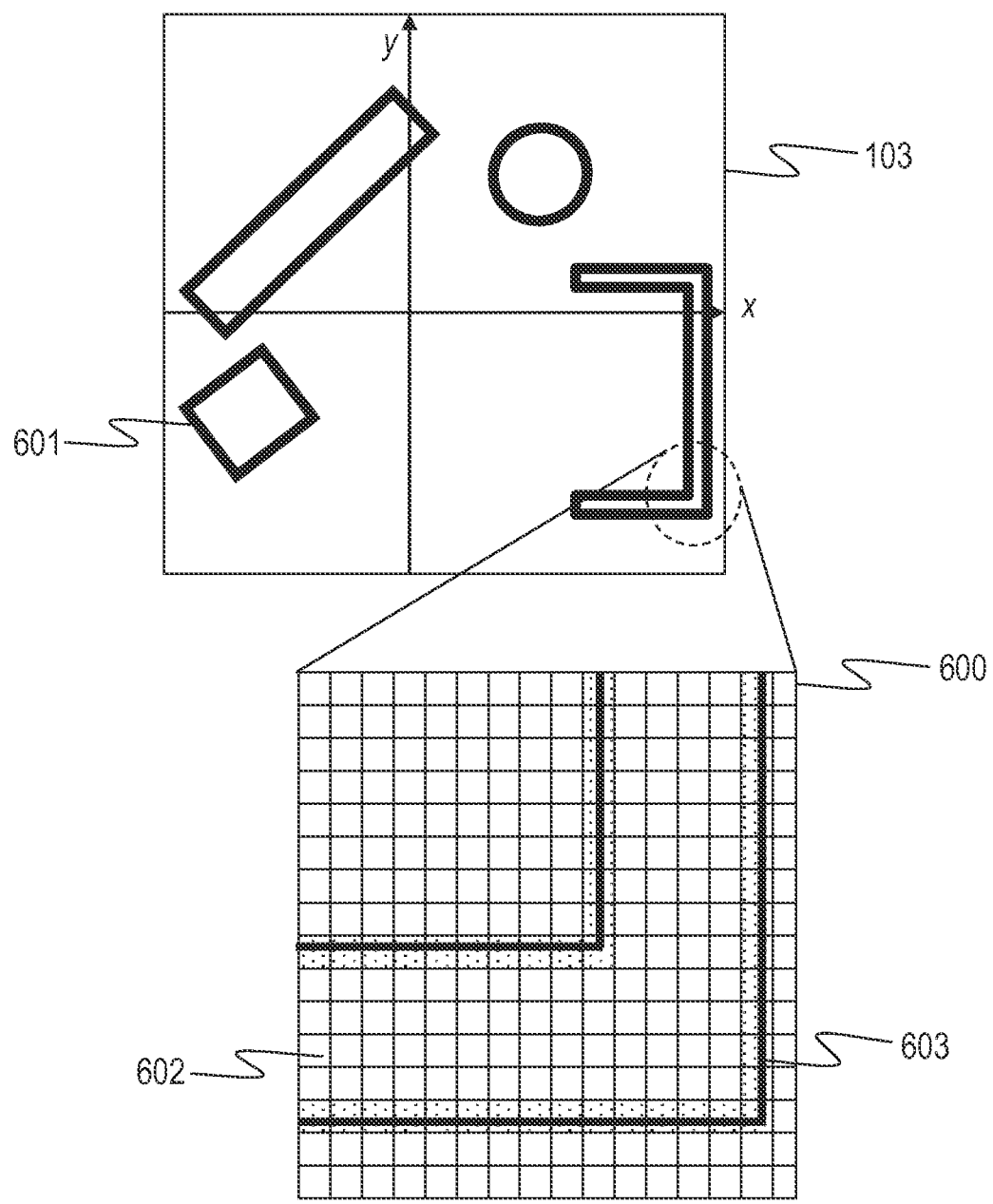
FIG. 6 is a conceptual diagram illustrating a method of representing the class-based map.

FIG. 6 is a conceptual diagram illustrating a method of representing the class-based map 103. As the representational form of the map, a map divided into small cells, such as a lattice map 600, may be used. It should be noted that because the lattice markings are too small if the shape of the entire space is illustrated as a lattice, in the following description, an enlarged portion of the lattice is used for the description. In the coordinate system of the map, the center is (0,0), the right direction represents the forward direction of the x axis, and the upward direction represents the forward direction of the y axis.

It should also be noted that the map coordinate system is not limited to this. The shapes existing in the space are represented as black lines, such as an object 601. The objects represented here are objects measured at a time point in the past, and recorded on the map. Next, an example of the representation of the lattice is described. An empty cell 602 represents that there is nothing in the space in the corresponding region. Further, an occupied cell 603 represents that an object exists in that cell. Whether or not an object exists is represented as an existence probability of the object in the form of a multivalue probability described below.

In this embodiment, the shape of an object in the space is represented on the map as an existence probability of the object. In the map, information about the object is recorded based on a vote value, which is converted into an existence probability during reading. First, the probability of an object existing for the value m(x,y) of the lattice cell at the coordinates (x,y) of the map coordinate system is p(m(x,y)). Here, p(m) is defined as in Expression 2 based on a sigmoidal function according to the value of the vote value.

$$p(m) = \frac{1}{1 + \exp(-m)} \quad \text{Expression 2}$$

Here, whether or not an object exists is determined from the value of p(m(x,y)) based on, for example, a comparison result with a parameter. Further, the probability p(m(x,y)) is calculated from the value of the vote value m(x,y) stored for each cell. The representational method of these maps is not limited to the example described above. Another method may be used, as long as such method is capable of recording the measured shapes. The maps according to this embodiment are provided in advance, and may be created using map generation technology (simultaneous localization and mapping) and the like.

Figure 7:
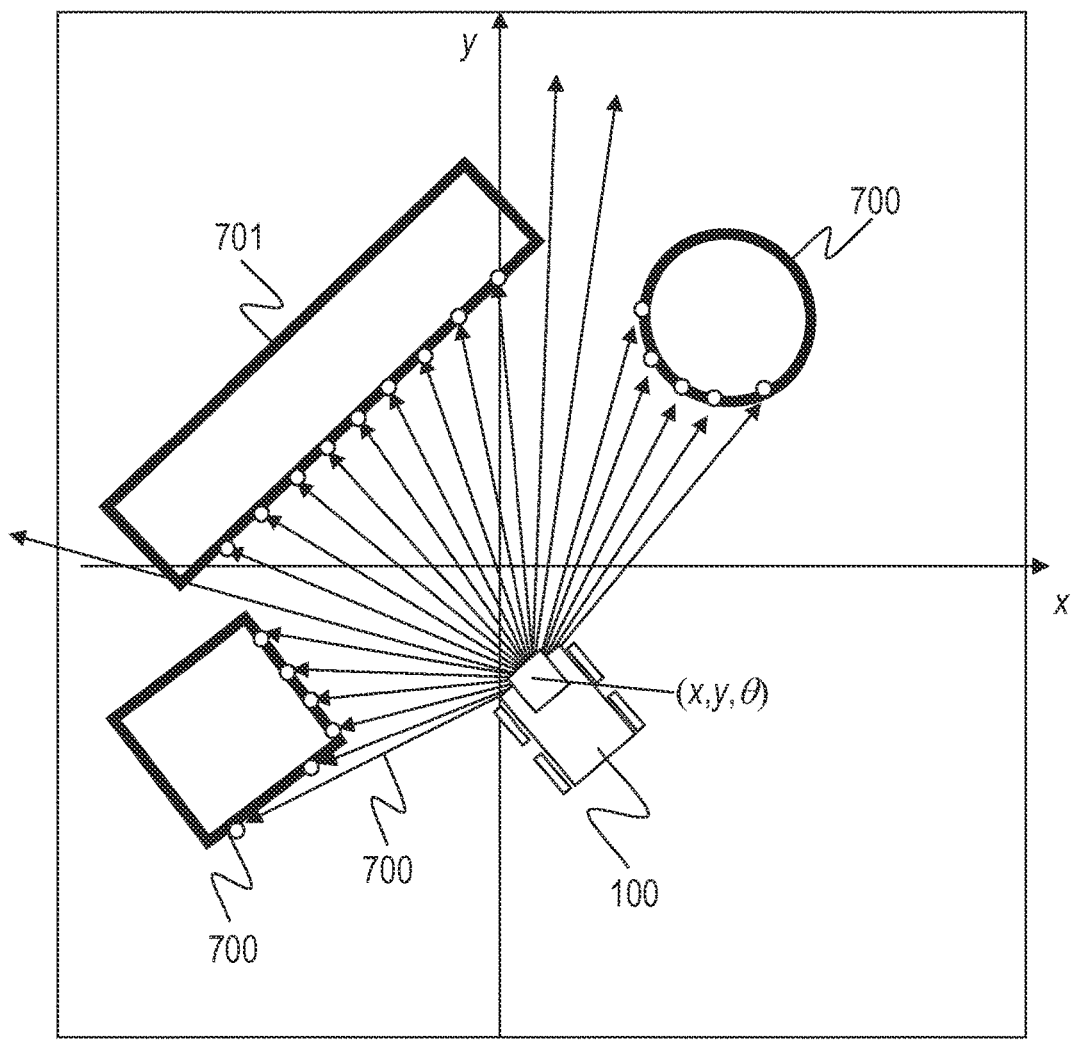
FIG. 7 illustrates an example of the class-based own-position estimation units estimating the position and orientation of a measurement location.

FIG. 7 illustrates an example of the class-based own-position estimation units 104 estimating the position and orientation of a measurement location by matching the shapes of surrounding objects with the class-based maps 103. In this processing, the position and orientation on the map of the measurement unit 100 can be estimated by searching for a rotation and translation conversion amount that allows each measurement point 700 of the measurement data measured by the measurement unit 100 to geometrically match a map 701. The position and orientation of the measurement location in the coordinate system of the map 701 is $(x,y,\theta)$. Here, converting the coordinates of the measurement result represented in the sensor coordinate system of Expression 1 into the map coordinate system $(t_{xi}, t_{yi})$ gives Expression 3.

$$t_{xi} = s_{xi} \cos\theta - s_{yi} \sin\theta + x$$

$$t_{yi} = s_{xi} \sin\theta + s_{yi} \cos\theta + y \quad \text{Expression 3}$$

$$i \in \{1 \ldots n\}$$

The map coordinate system is determined as a linear transformation from the coordinate system of the measurement unit 100. The optimum position $(x^*, y^*, \theta^*)$ when the result obtained by converting into the map coordinate system is geometrically adjusted to the map is determined as shown in Expression 4. Expression 4 can be solved by a search method such as a method of steepest descent by plugging in an initial value close to the optimum solution in advance.

$$(x^*, y^*, \theta^*) = \underset{x,y,\theta}{\operatorname{argmax}} \prod_i p(m(t_{xi}, t_{yi})) \quad \text{Expression 4}$$

Figure 8:
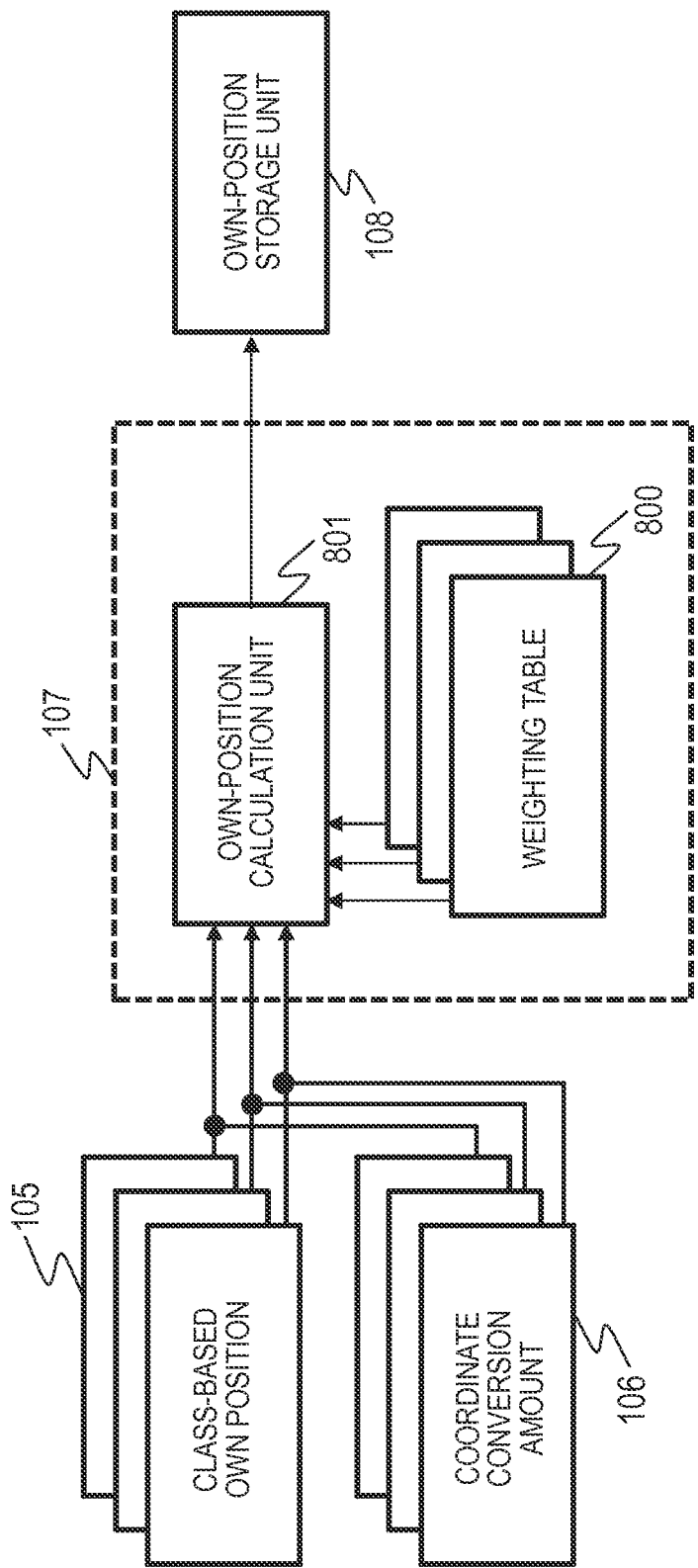
FIG. 8 illustrates processing in which the integration unit integrates the class-based own positions.

FIG. 8 illustrates processing in which the integration unit 107 integrates the class-based own positions 105 obtained by the class-based own-position estimation units 104. When the class-based maps 103 are recorded in different coordinate systems from each other, the class-based own positions 105 estimated based on each map are also represented by the coordinate systems of each map. In order to integrate each of the own-position estimation results, it is necessary to convert the results into one coordinate system. Therefore, the integration unit 107 determines in advance a coordinate conversion amount 106 $(p_x, p_y, p_\theta)$ from a comparative positional relationship among the maps into predetermined coordinates, and converts each own-position estimation result as shown in Expression 5.

$$x = x^* + p_x$$

$$y = x^* + p_y$$

$$\theta = \theta^* + p_\theta \quad \text{Expression 5}$$

In addition, the integration unit 107 determines the own position of the robot by taking a weighted average with an own-position calculation unit 801 of each of the own-position estimation results converted into one coordinate system using a weighting recorded in a weighting table 800, and stores the determined own position in the own-position storage unit 108.

Figure 9:
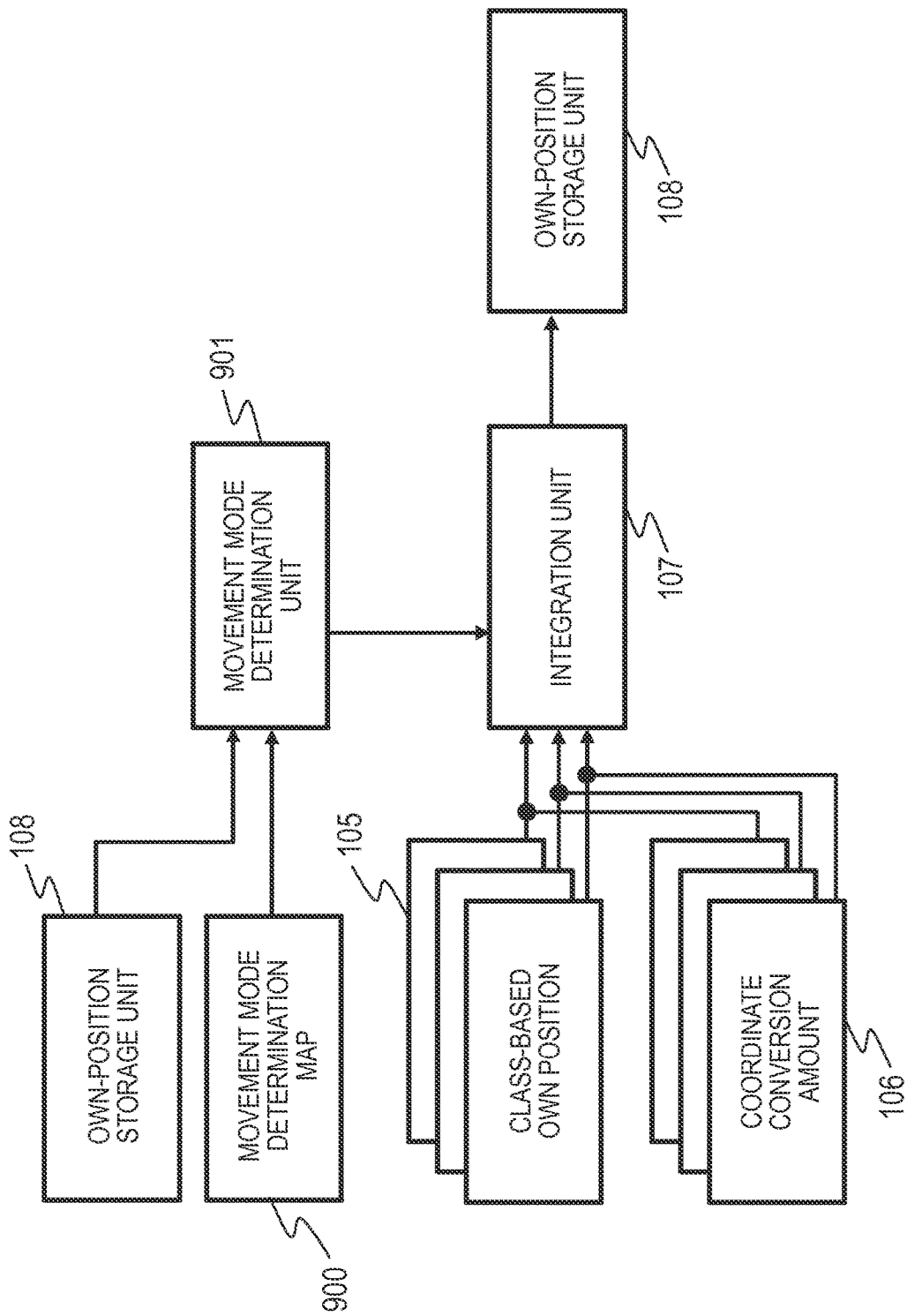
FIG. 9 illustrates a procedure for own-position recognition based on a movement mode.

The robot may also set a predetermined priority for each class, and use an own position estimated based on a class having a high priority. When the robot is moving through the environment, it is desirable if the objects to be preferentially utilized when estimating the own position can be changed based on the location and situation. FIG. 9 illustrates a procedure for own-position recognition based on a movement mode. The own-position storage unit 108 stores an own position obtained from a measurement result measured immediately beforehand. A movement mode determination map 900 associates a predetermined mode with each location in the space. A movement mode determination unit 901 calculates the mode corresponding to the position of the robot, and notifies the integration unit 107 of that mode. The integration unit 107 integrates the class-based own positions based on the notified mode.

Figure 10:
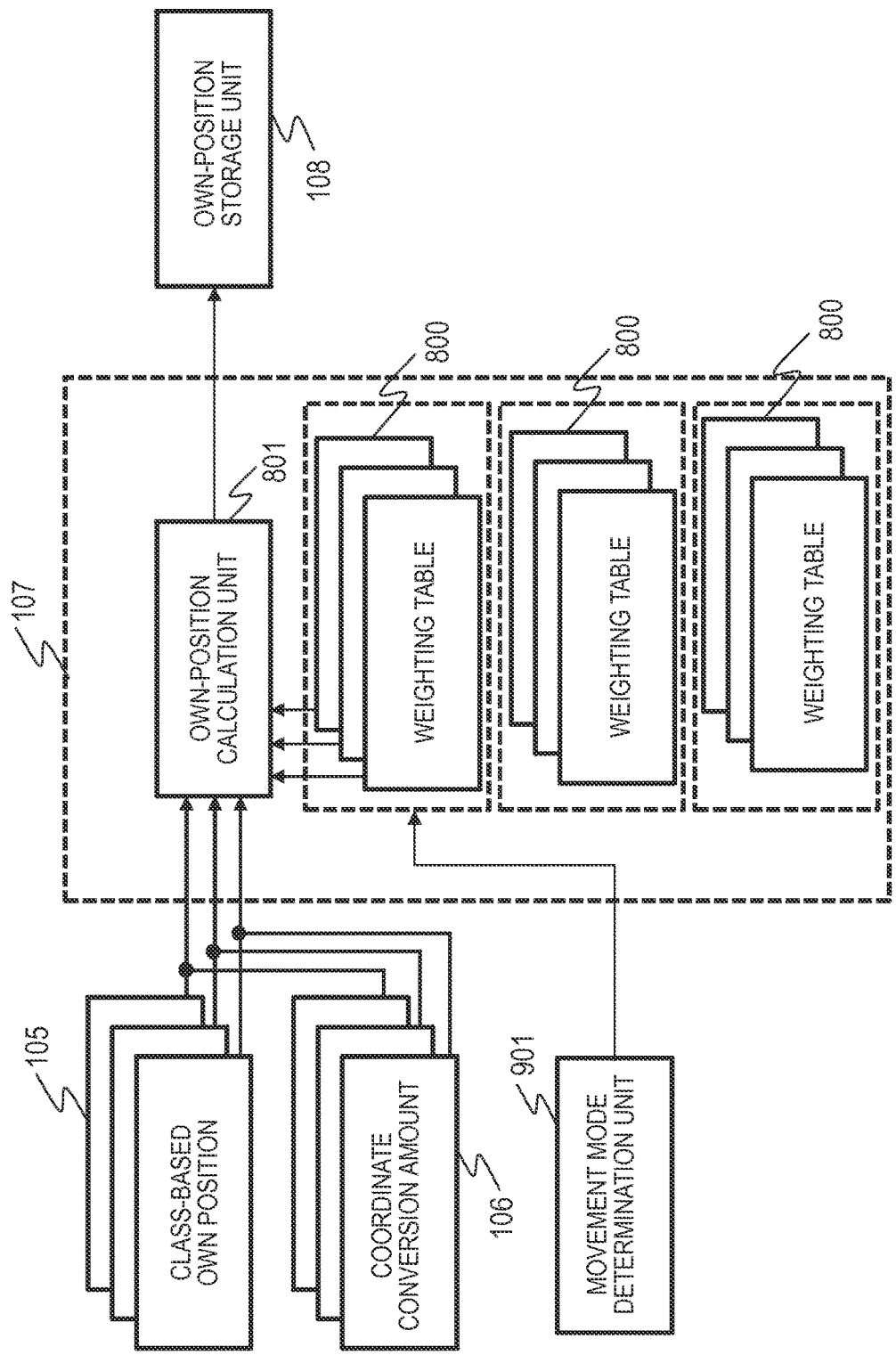
FIG. 10 illustrates a procedure in which the integration unit calculates the own position of the robot.

FIG. 10 illustrates a procedure in which the integration unit 107 calculates the own position of the robot based on a predetermined movement mode. The movement mode indicates which class is to be preferentially utilized in the own-position estimation based on the mode. Weighting tables 800 different for each mode are prepared in advance. Although FIG. 10 illustrates three types of mode, the number of types of mode is not limited to three. The integration unit 107, which stores each weighting table 800 corresponding to each mode, calculates the own position of the robot using the weighting table 800 corresponding to the mode determined by the movement mode determination unit 901.

Figure 11:
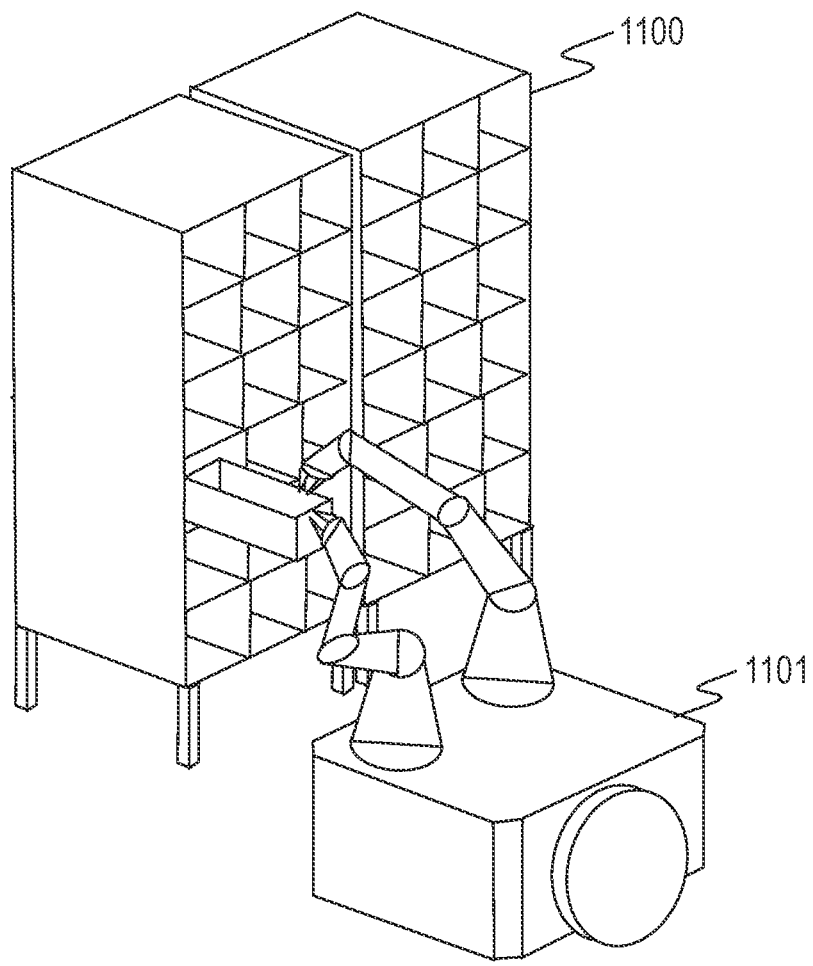
FIG. 11 illustrates a determination example of the movement mode and own-position estimation processing for an articulated robot that is near a shelf.

FIG. 11 illustrates a determination example of the movement mode and own-position estimation processing for an articulated robot 1101 that is near a shelf 1100. When the articulated robot grasps an article on a shelf, it is necessary for the robot to know the position of the shelf in detail. On the other hand, it is difficult to record the precise position of all the shelves in the environment in the map in advance, and hence errors may be carried over into the map regarding the actual arrangement. Consequently, when trying to grip an article on a shelf just by referring to a map of the overall space, a problem can occur in which the article on the shelf cannot be gripped due to the effects of errors.

Consequently, as illustrated in FIG. 11, when the robot is near a shelf and trying to grasp an article on a shelf while avoiding colliding with the shelf, the comparative relationship of the robot position with the shelf position that can be measured at that location is important. Therefore, in this case, for the weighting table, it is important to give a larger weighting to the shelf legs. Therefore, a weighting table is prepared that gives a larger weighting to the shelf legs, and a movement mode corresponding to that weighting table is registered in the mode determination map for the region in which the shelf is placed.

In addition, when the robot grips an article on the shelf, a detailed position of the gripping target is necessary. However, because the precise position of the gripping target is unknown, it is difficult to grasp the target article based only on the own position of the robot and articular angle information. Therefore, the interior of the shelf is measured with a distance sensor mounted on the robot's fingers. In the movement mode when grasping the article on the shelf, the weighting of the own position relating to the comparative orientation with the gripping target article obtained from the shape of the shelf interior is increased, and the weighting obtained from the own position of the robot and the articulated angle information is decreased. As a result, the target article can be precisely gripped.

Figure 12:
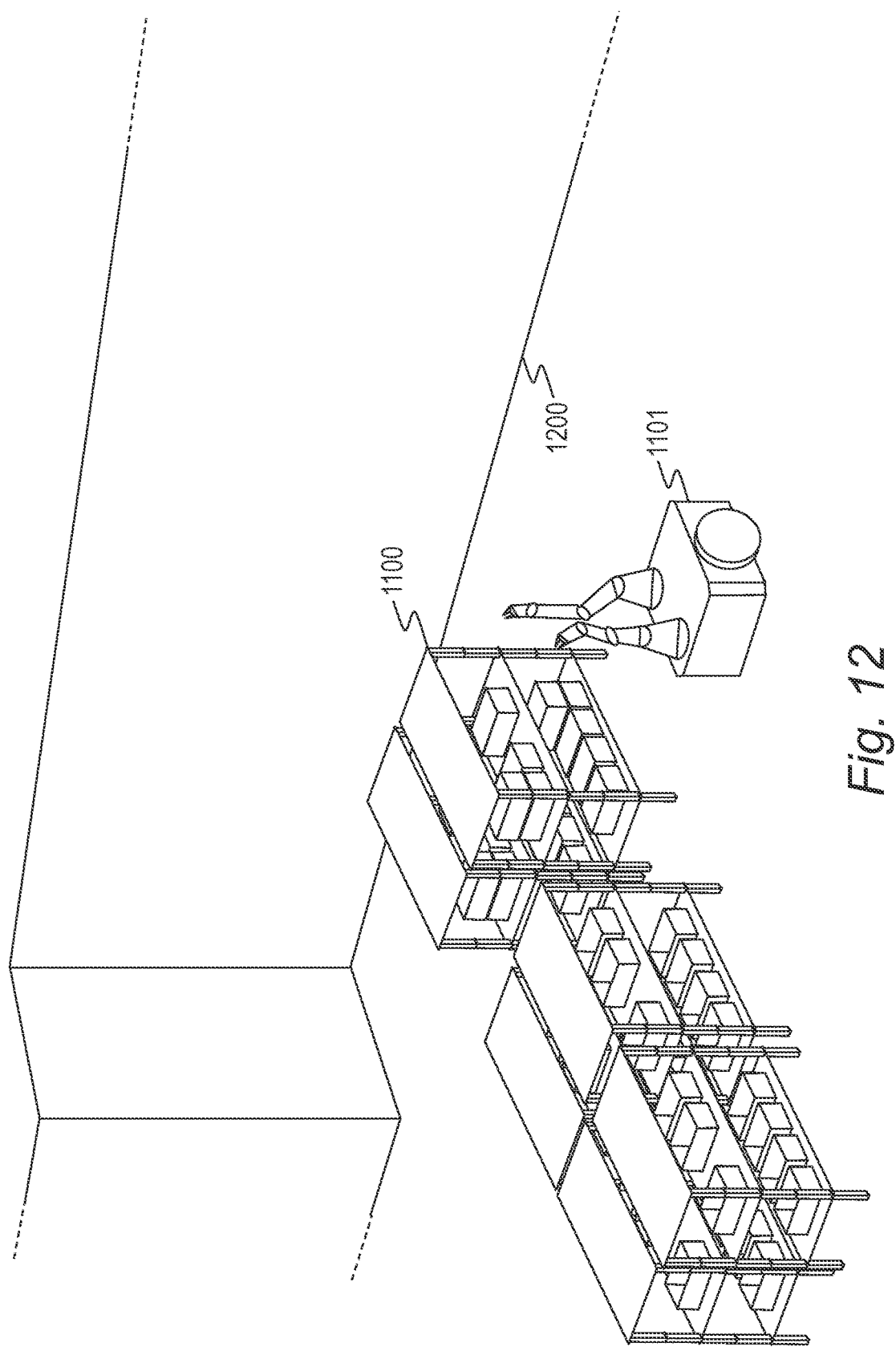
FIG. 12 illustrates a determination example of the movement mode and an own-position estimation example for a spacious location.

FIG. 12 illustrates a determination example of the movement mode and an own-position estimation example for a spacious location. In this case, it is sufficient for the robot to move without colliding with a wall 1200 or a shelf 1100, and it is not necessary to utilize a detailed position of the shelf. On the other hand, information obtained from the arrangement of the wall and the like regarding the approximate position of the robot in the overall space is important. Therefore, the own-position estimation can be carried out based on both the wall and the shelf by increasing, as the weighting, the weighting of the wall and decreasing the weighting of the shelf legs. In other words, in a spacious area such as that illustrated in FIG. 12, the movement mode is selected so that a weighting table based on the wall is selected.

According to the first embodiment of this invention, a seamless own-position estimation result can be obtained even when a robot moves back and forth between a region in which movable objects are dominant and a region in which completely still objects are dominant, by appropriately integrating class-based own-position estimation results obtained from measurement data divided into classes, such as movable objects and completely still objects, with the use of weighting based on the existence ratio and the like.

Second Embodiment

In this embodiment, the movement procedure of a low-profile robot configured to lift up and carry a shelf is described.

Figure 13:
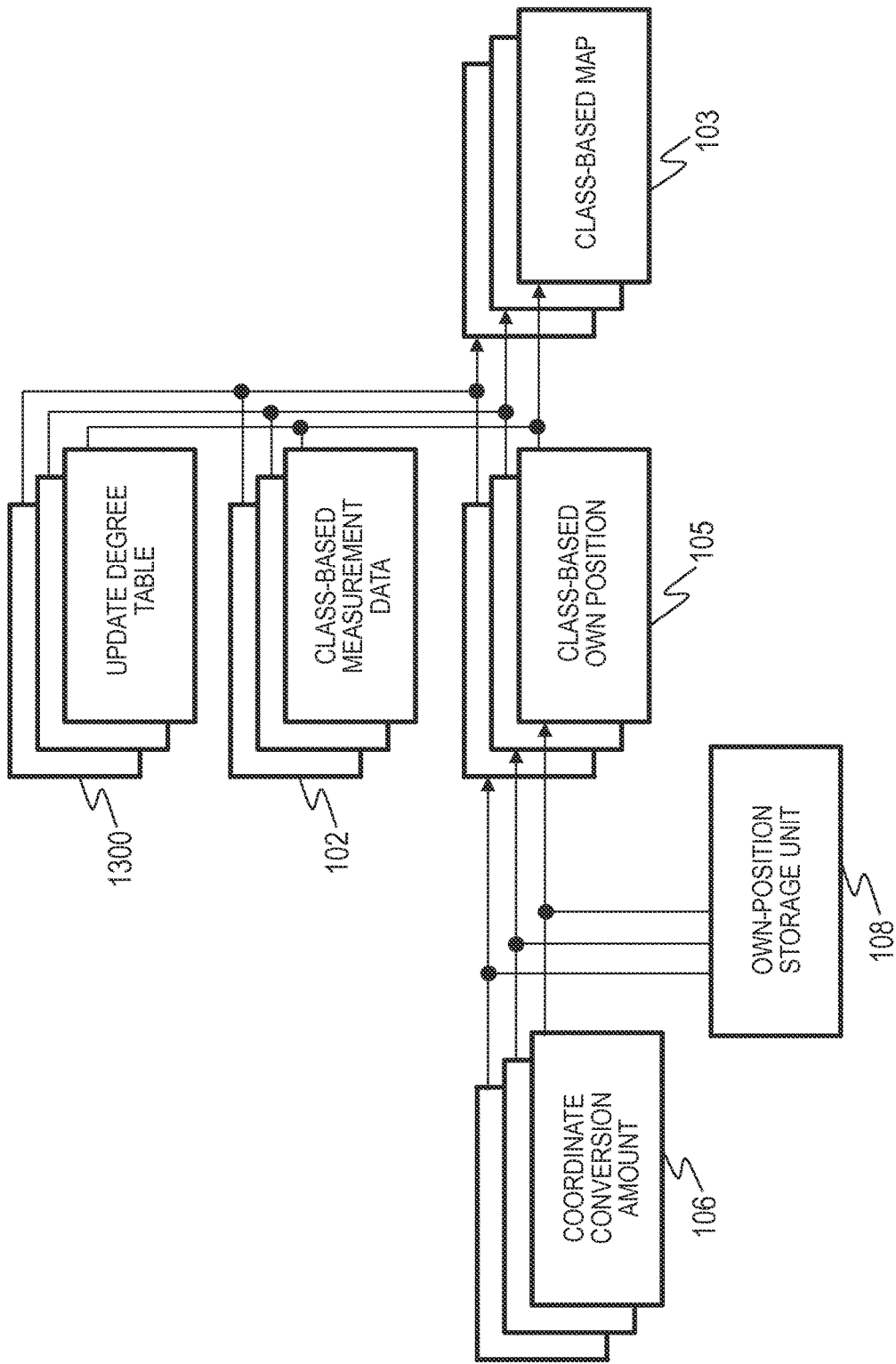
FIG. 13 illustrates a procedure for updating the above-mentioned maps based on measurement data.

FIG. 13 illustrates a procedure for updating the above-mentioned maps based on measurement data. When the robot is carrying a shelf, the position of the shelf changes over time. Consequently, the shape of the environment changes, and hence the position information about the objects shown in the maps needs to be updated. The maps are updated by correcting the class-based own positions 105 based on the coordinate conversion amount 106 and the estimated own positions stored in the own-position storage unit 108, and using the corrected own positions and the class-based measurement data 102 to update the class-based map 103 of the corresponding class.

In the update, the vote value m(x,y) stored for the coordinates corresponding to the position where the object is measured is increased or decreased. This allows the existence probability of an object at that position to be increased or decreased. The position $(t_x, t_y)$ of the lattice map is determined based on Expressions 6 and 7 from the measured shape and the position of the measurement unit 100 at the measurement time point. Parameters α and β relating to the update degree at this time are set by inputting for each class a predetermined value into an update degree table 1300 in advance.

$$m(t_x, t_y) \leftarrow m(t_x, t_y) + \alpha \qquad \text{Expression 6}$$

$$m(t_x, t_y) \leftarrow m(t_x, t_y) - \beta \qquad \text{Expression 7}$$

Figure 14:
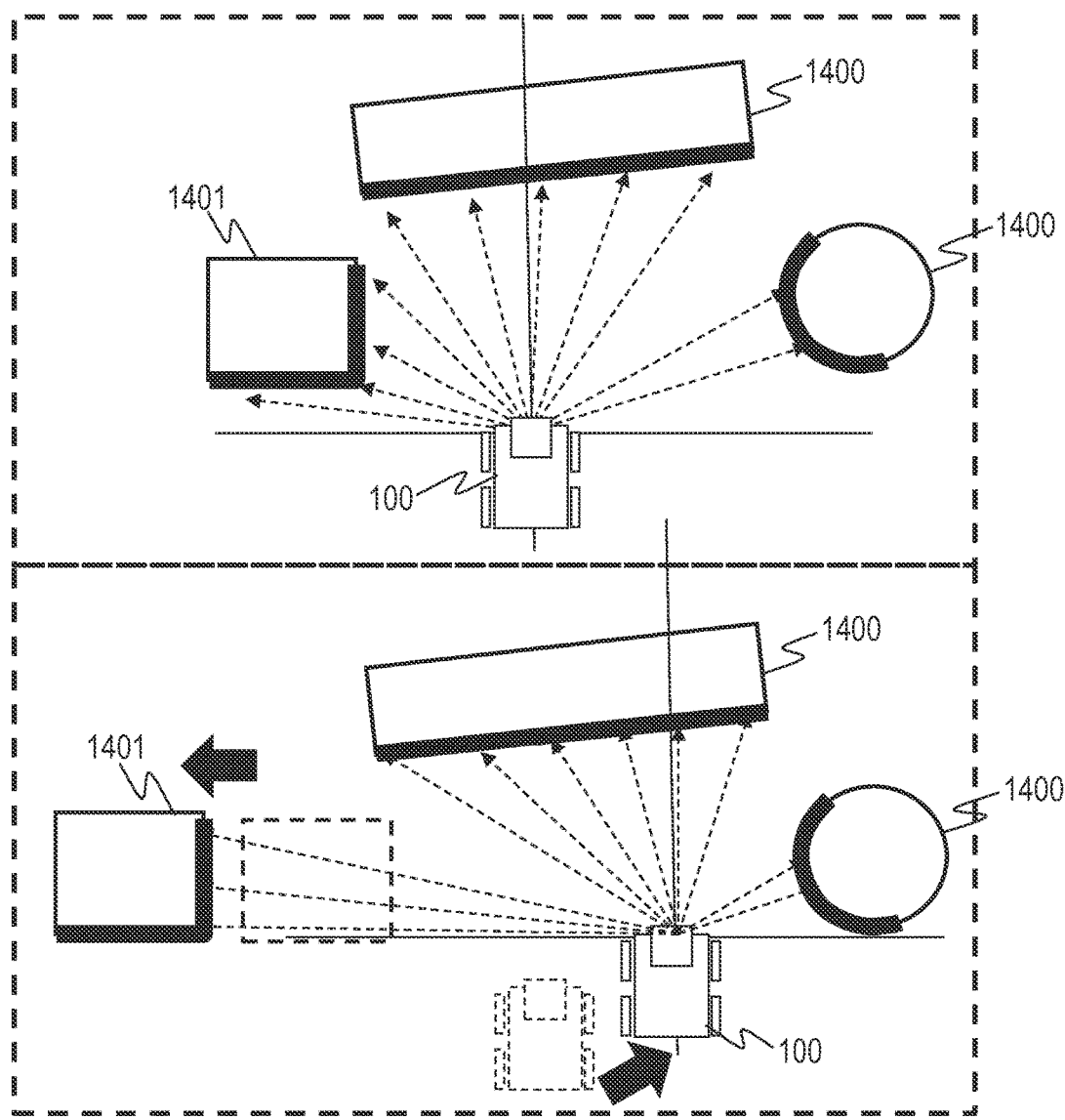
FIG. 14 illustrates a case in which measurement is consecutively carried out twice, illustrating both the first environment shape and the second environment shape.
Figure 15:
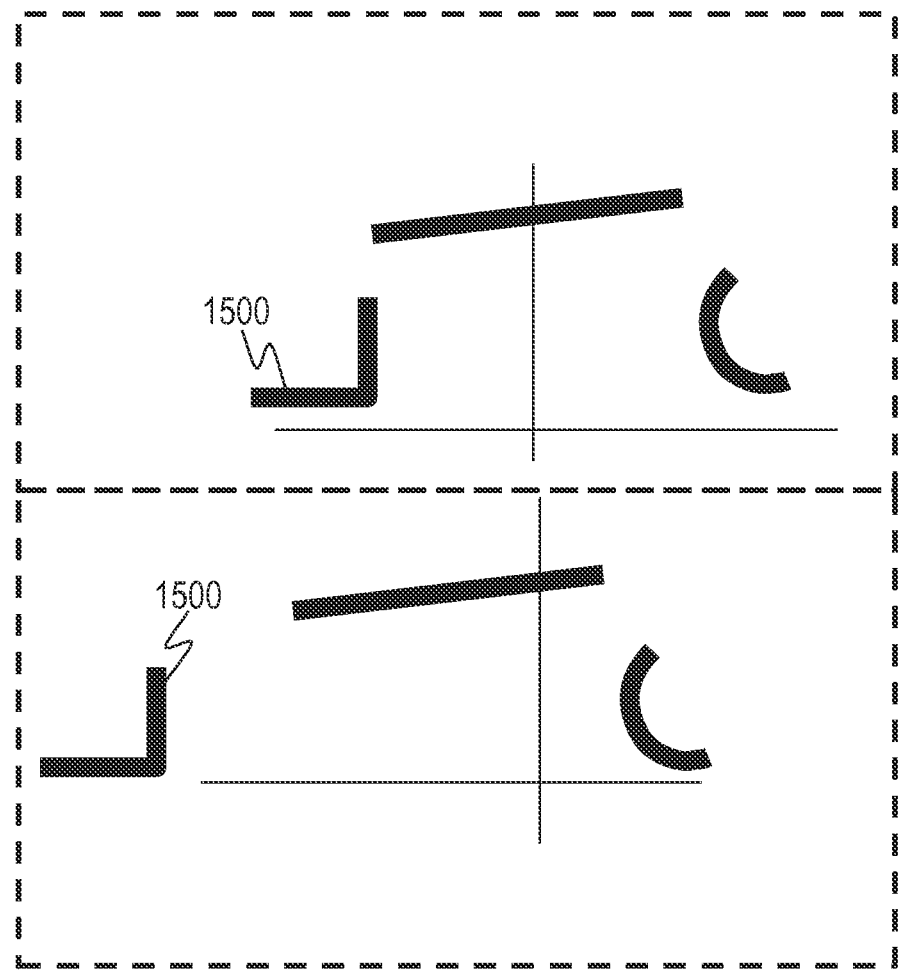
FIG. 15 illustrates the two measurement results in this situation.
Figure 16:
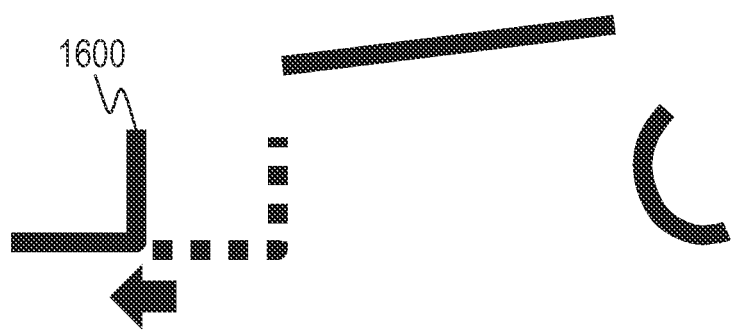
FIG. 16 illustrates the results of these pieces of measurement data being converted so that they geometrically match.

FIGS. 14 to 16 illustrate a procedure in which the classification unit separates a moving object, such as another robot, that is moving from the measurement data. FIG. 14 illustrates a case in which measurement is consecutively carried out twice, illustrating both the first environment shape and the second environment shape. Here, at the point when the second measurement is carried out, the circle on the right side and the rectangular shape are still objects 1400, and the square shaped object on the left side is a moving object 1401 moving to the left. Further, the robot itself has also moved to the right and up.

FIG. 15 illustrates the two measurement results in this situation. As illustrated in FIG. 15, it can be confirmed that the origin of the measurement data has changed because the robot moved, and that the arrangement of the measured moving object 1500 has changed. FIG. 16 illustrates the results of these pieces of measurement data being converted so that they geometrically match. As illustrated in FIG. 16, an extracted moving object 1600 is obtained by extracting a portion that is the difference between the data after having made the shape data geometrically match. Adding this processing to the classification unit illustrated in FIG. 4 allows separation into classes indicating a moving object, in addition to classes extracted based on shape matching and classes extracted based on brightness.

Figure 17:
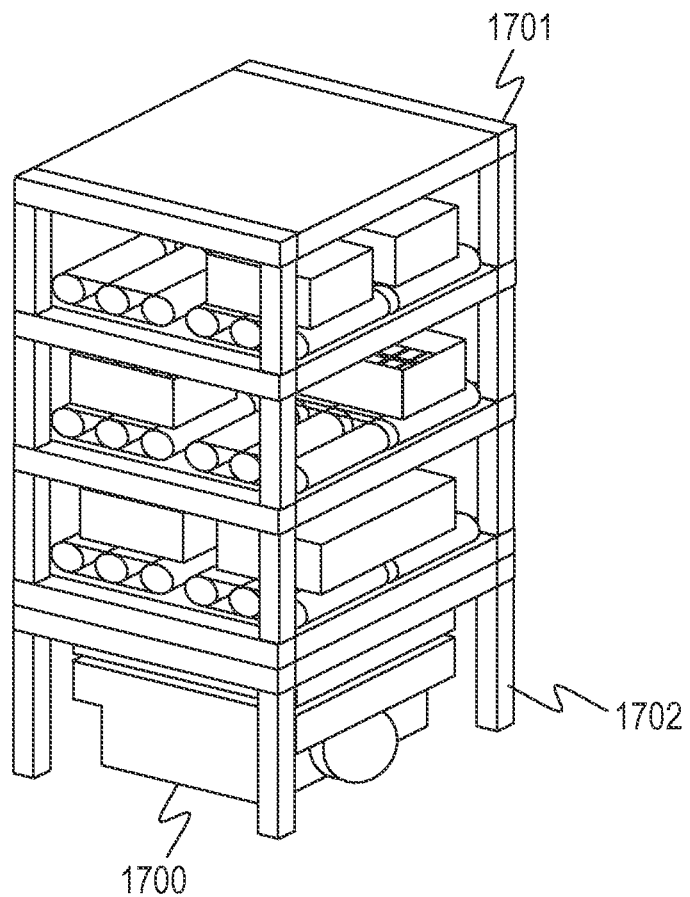
FIG. 17 illustrates a procedure when performing own-position estimation by determining the movement mode when a low-profile robot is under a shelf.

FIG. 17 illustrates a procedure when performing own-position estimation by determining the movement mode when a low-profile robot 1700 is under a shelf. When the low-profile robot 1700 is under a shelf 1701, the low-profile robot 1700 needs to move precisely without contacting shelf legs 1702. In this case, increasing the weighting of the shelf legs 1702 similarly to the case illustrated in FIG. 11 enables the own position of the robot to be determined as a comparative orientation with respect to the shelf legs 1702, and hence the robot can move precisely without contacting the shelf legs.

Further, when using a camera instead of a distance sensor, the comparative relationship between the position of the low-profile robot and the shelf position may be recognized by observing a marker placed on a lower surface of the shelf. In the area where the robot is under the shelf, by selecting a weighting table in which the weighting of the comparative relationship with the shelf obtained by the camera is high and the weighting of the own-position estimation result obtained by the distance sensor is low, the low-profile robot can obtain a precise own-position estimation directly under the shelf.

Figure 18:
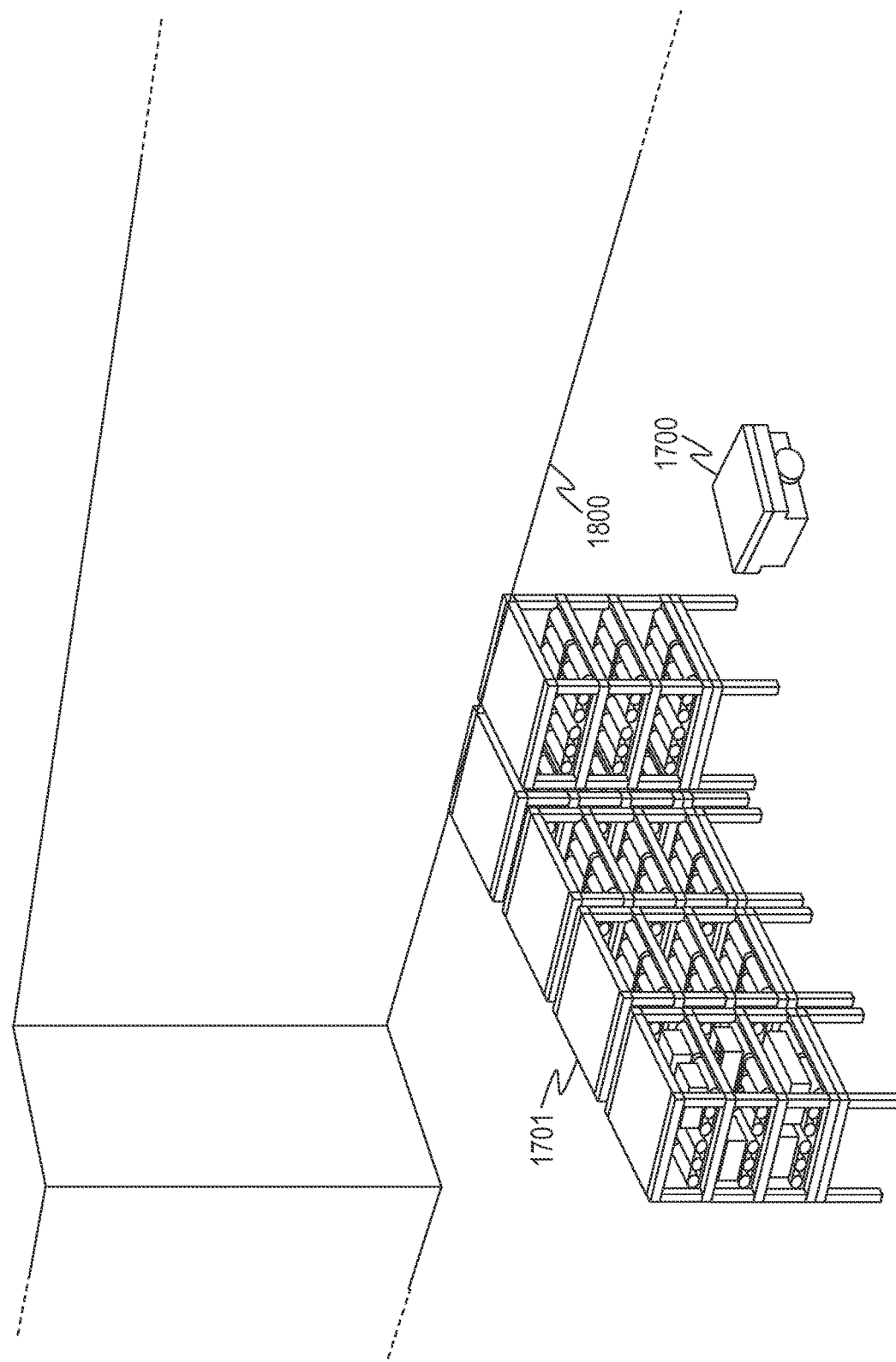
FIG. 18 illustrates a case in which own-position estimation is performed in a spacious area.

FIG. 18 illustrates a case in which own-position estimation is performed in a spacious area. When the robot moves through a spacious area, similar to the example described with reference to FIG. 12, it is desirable to perform the own-position estimation by prioritizing the position of the wall 1800. In this case, the own-position estimation is performed using a weighting table that gives a larger weighting to the wall.

Figure 19:
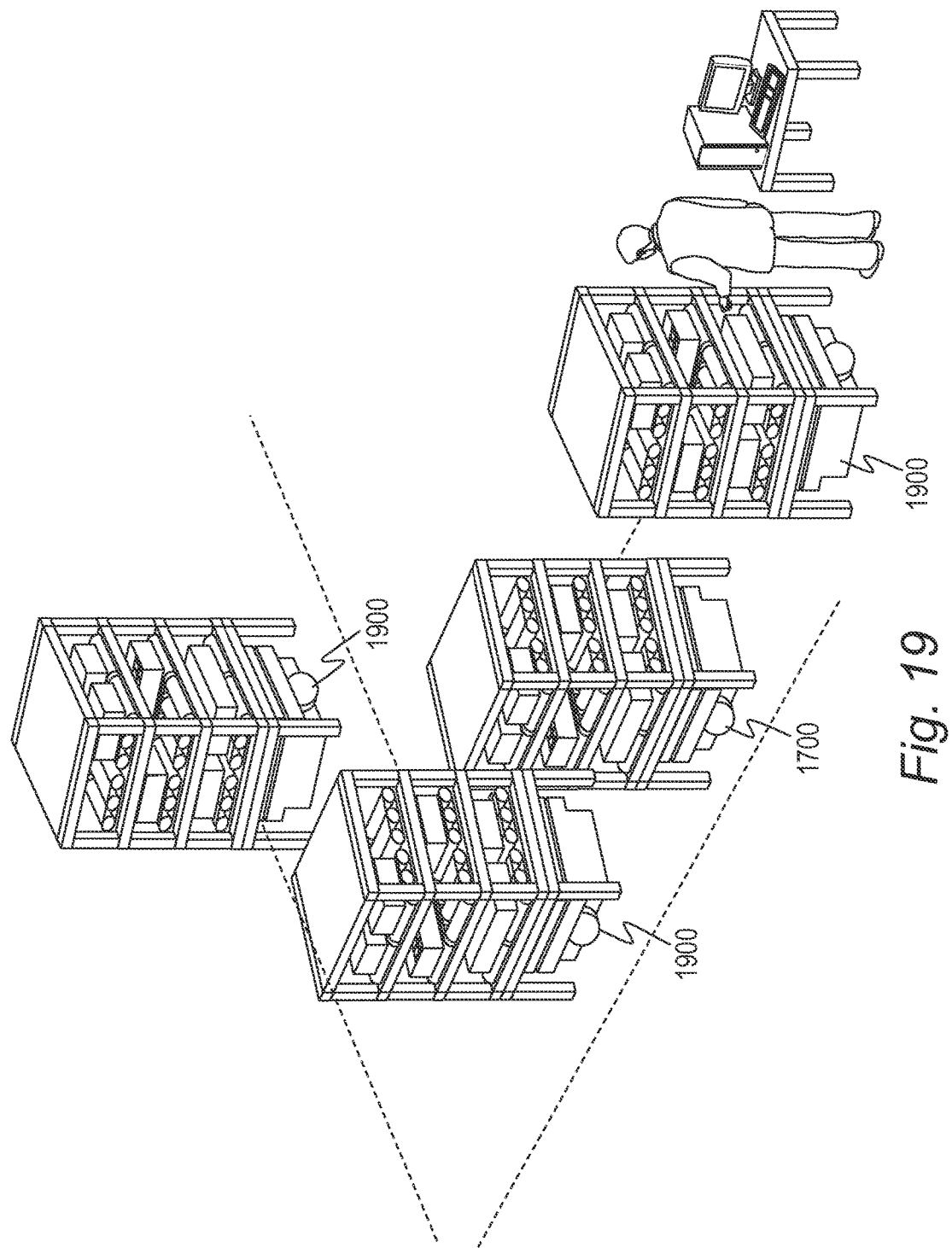
FIG. 19 illustrates a case in which own-position estimation is performed in an environment in which other robots are present.

FIG. 19 illustrates a case in which own-position estimation is performed in an environment in which a plurality of other robots 1900 are present. Because moving objects are not shown in the map, a robot 1700 cannot determine its own position in the overall space even by using information about moving objects. In this case, a precise operation can be carried out by decreasing the weighting of the class classified by the classification unit as being a moving object, and determining the position and orientation of the robot 1700 with respect to a still object in the environment.

Further, when following another robot 1900, a target robot 1900 can be followed by increasing the weighting of the robot to be followed, and issuing a control to the mobile unit to follow that robot 1900.

Third Embodiment

Figure 20:
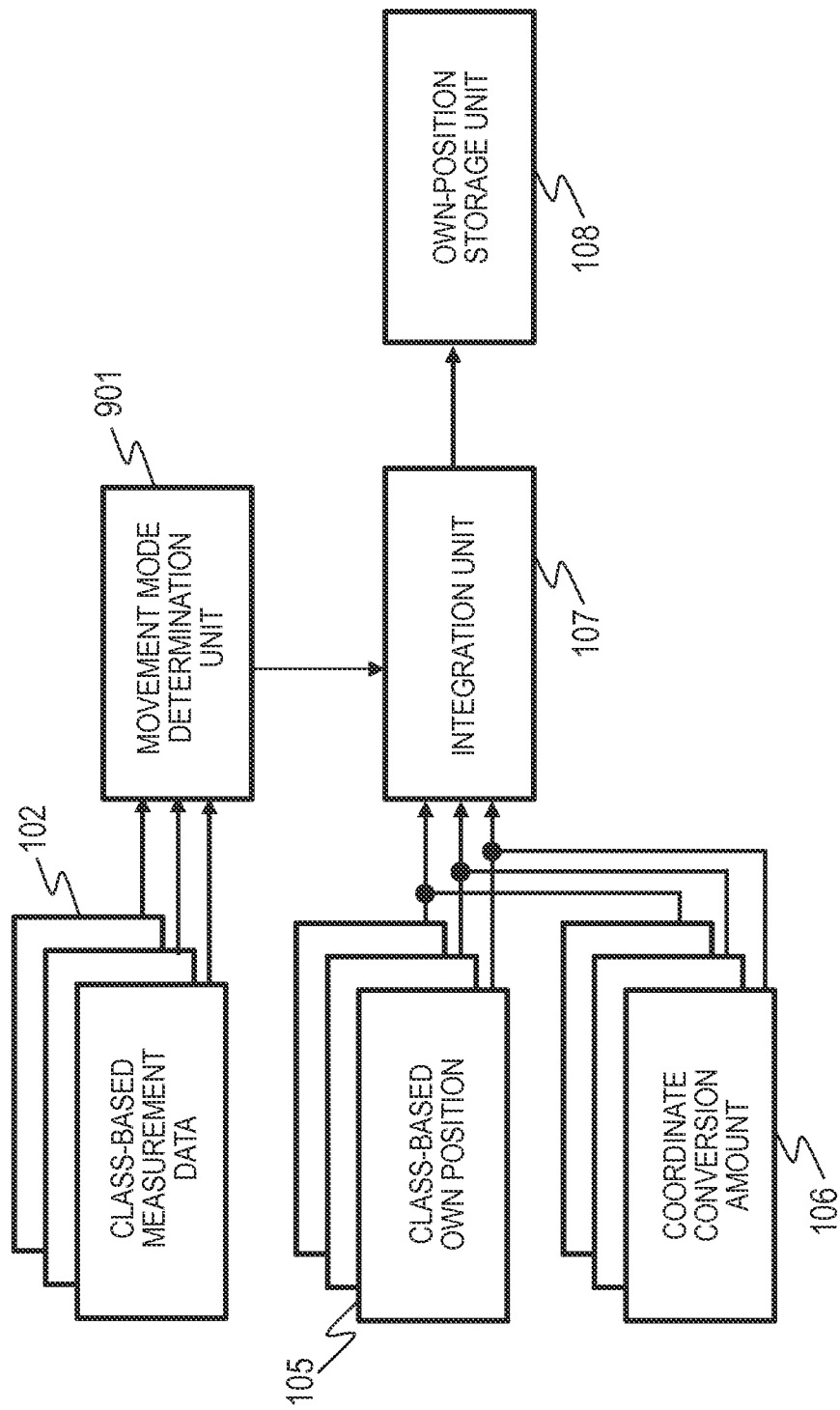
FIG. 20 illustrates a procedure for determining the movement mode based on a measurement result.

FIG. 20 illustrates a procedure for determining the movement mode based on a measurement result. In this embodiment, the movement mode is determined using measurement results of the surroundings. In this embodiment, the weighting when the integration unit 107 performs own-position estimation is determined by, using class-based measurement data 102, selecting a weighting table that emphasizes the class having the most amount of measurement data.

The specific integration processing is carried out by, using the class-based own positions 105 and the coordinate conversion amount 106 in the same manner as in FIG. 9, converting into own positions in a predetermined coordinate system, and integrating the converted own positions based on the weighting table 800 determined by the movement mode determination unit 901. For example, as the measurement result, when a large number of objects having a strong reflection intensity are measured, the weighting of the own positions of that class is increased.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A mobile robot comprising:
   a measurement unit configured to measure an object in a space;
   a storage unit configured to store map data representing information about the object in the space determined in advance;
   an own-position estimation unit configured to calculate an own position of the mobile robot moving through the space by matching measurement data acquired by the measurement unit with the map data wherein the own-position estimation unit includes:
      a classification unit configured to acquire class-based measurement data obtained by classifying the measurement data into at least two predetermined classes;
      a class-based own-position estimation unit configured to estimate an estimated own position of the mobile robot for each of the at least two predetermined classes by matching a class-based map having a position of the objects recorded therein for each class with the class-based measurement data;
      an integration unit configured to integrate the estimated own positions for the respective at least two predetermined classes by taking a weighted average of the estimated own positions to determine a determined own position; and wherein the mobile robot includes
   a control unit configured to control the mobile robot based on the determined own position from the integration unit.

2. The mobile robot according to claim 1,
   wherein the class-based map is recorded for each class in a coordinate system determined in advance, the class-based map defining a comparative positional relationship between the coordinate systems as a coordinate conversion amount, and
   wherein the integration unit is configured to integrate the estimated own positions for the respective at least two predetermined classes based on the coordinate conversion amount.

3. The mobile robot according to claim 1, wherein the integration unit comprises means for changing an integration method, used by the integration unit to integrate the estimated own positions for the respective at least two predetermined classes, based on a movement mode set in advance.

4. The mobile robot according to claim 3, further comprising:
   a movement mode determination map having a predetermined movement mode for each location in the space set therein in advance; and a movement mode determination unit configured to select the predetermined movement mode shown in the movement mode determination map corresponding to the determined own position.

5. The mobile robot according to claim 4, wherein the movement mode determination unit is configured to select the predetermined movement mode based on a class for which most measurement data is obtained of the class-based measurement data.

6. The mobile robot according to claim 1, wherein the weighted average is taken for each of the at least two predetermined classes.

7. The mobile robot according to claim 1, wherein the integration unit is configured to use the estimated own position by a class having a priority higher than another priority based on a priority set for each class.

8. The mobile robot according to claim 1, further comprising at least one articulated robot,
wherein the at least one articulated robot is controlled based on the own positions.

9. The mobile robot according to claim 1, further comprising an update unit configured to update, based on a class calculated by the classification unit from information about an object newly measured by the measurement unit, the map having the object classified in the class recorded therein.

10. The mobile robot according to claim 9, wherein the update unit is configured to update the map based on an update degree conferred in advance based on the class.

11. The mobile robot according to claim 1,
wherein the measurement unit is capable of measuring a predetermined attribute of the object in the space,
wherein the at least two predetermined classes are classified based on the predetermined attribute to be measured by the measurement unit, and
wherein the classification unit is configured to divide the measurement data into classes based on the predetermined attribute.

12. The mobile robot according to claim 11, wherein the classification unit is configured to extract characteristic points relating to a corner and an edge from the measurement data, and perform classification based on a size and a planarity of a shape existing between the characteristic points.

13. The mobile robot according to claim 1, wherein the classification unit is configured to divide the measurement data into classes by geometrically matching the measurement data with a predetermined shape, and extracting a portion similar to the predetermined shape.

14. The mobile robot according to claim 1,
wherein the at least two predetermined classes are further divided into a still object and a columnar object each having a fixed predetermined shape in the space, and
wherein the classification unit is configured to determine a class by geometrically comparing each portion of the measurement data with each of the still object and the columnar object.

15. The mobile robot according to claim 1,
wherein the at least two predetermined classes are further classified into a moving object that is still moving, and
wherein the classification unit is configured to compare the measurement data measured immediately before with measurement data measured previously, and set a portion that has a difference as the moving object.

* * * * *